(12) United States Patent
Coleman et al.

(10) Patent No.: US 6,499,662 B1
(45) Date of Patent: Dec. 31, 2002

(54) FAST EDGE DETECTION SYSTEM TOLERANT OF HIGH DEGREE OF INTERSYMBOL INTERFERENCE

(75) Inventors: Edward P. Coleman, Liverpool, NY (US); James E. Colley, Junction City, OR (US); Patrick M. O'Donnell, Springfield, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/395,089

(22) Filed: Sep. 13, 1999

Related U.S. Application Data

(60) Provisional application No. 60/100,268, filed on Sep. 14, 1998.

(51) Int. Cl.[7] .................................................. G06K 7/10
(52) U.S. Cl. .............................. 235/462.18; 235/462.25
(58) Field of Search ......................... 235/462.18, 462.01, 235/462.06, 462.12, 462.25, 462.26, 462.27, 462.45, 472.01, 472.03, 476

(56) References Cited

U.S. PATENT DOCUMENTS

| | | | | |
|---|---|---|---|---|
| 3,993,894 A | | 11/1976 | Walker ................. 235/61.11 E |
| 4,000,397 A | | 12/1976 | Herbert et al. ........... 235/61.11 |
| 4,262,257 A | * | 4/1981 | Lawrence .................. 329/150 |
| 4,987,500 A | * | 1/1991 | Bizjak et al. ................ 360/46 |
| 5,019,698 A | * | 5/1991 | Eastman ................ 245/472.01 |
| 5,210,397 A | | 5/1993 | Eastman .................... 235/436 |
| 5,210,398 A | * | 5/1993 | Metlitsky .............. 235/462.01 |
| 5,446,271 A | | 8/1995 | Cherry et al. .............. 235/462 |
| 5,449,893 A | | 9/1995 | Bridgelall et al. .......... 235/462 |
| 5,463,211 A | | 10/1995 | Arends et al. .............. 235/462 |
| 5,493,108 A | | 2/1996 | Cherry et al. .............. 235/454 |
| 5,528,023 A | | 6/1996 | Buttrini et al. ............. 235/462 |
| 5,612,531 A | | 3/1997 | Barkan ...................... 235/462 |
| 5,777,309 A | * | 7/1998 | Maltsev et al. ........ 235/462.01 |
| 5,811,782 A | | 9/1998 | Sato et al. .................. 235/462 |
| 5,923,023 A | | 7/1999 | Arends et al. .......... 235/462.25 |
| 5,925,868 A | | 7/1999 | Arends et al. .............. 235/454 |
| 5,936,224 A | * | 8/1999 | Shimizu et al. ........... 235/462.1 |
| 6,073,849 A | * | 6/2000 | Colley et al. ........... 235/462.27 |

\* cited by examiner

*Primary Examiner*—Thien M. Le
*Assistant Examiner*—Daniel St. Cyr
(74) *Attorney, Agent, or Firm*—Stoel Rives LLP

(57) ABSTRACT

A system and method for improving the accuracy of edge detection under high Inter-Symbol Interference, or ISI, conditions is disclosed. The amplified and filtered first derivative signal is offset by equal amounts in both directions to generate positive and negative offsets which serve as inputs to negative and positive peak detectors, respectively. The offset is determined by a fast adaptive peak detector provided by attenuating and AC-coupling the first derivative signal to the positive supply to drive a peak detector with a fairly short attack time, such that its output is nearly settled on the first peak of the first derivative signal, but having a decay time long enough to keep the threshold level approximately constant across the label. Peaks are qualified if the peak in question differs in amplitude from the previously qualified peak by the offset amount. Thus, peaks are qualified if their modulation depth exceeds a threshold, regardless of the absolute level of the peaks (such qualification strategy is referred to as modulation depth gating).

31 Claims, 7 Drawing Sheets

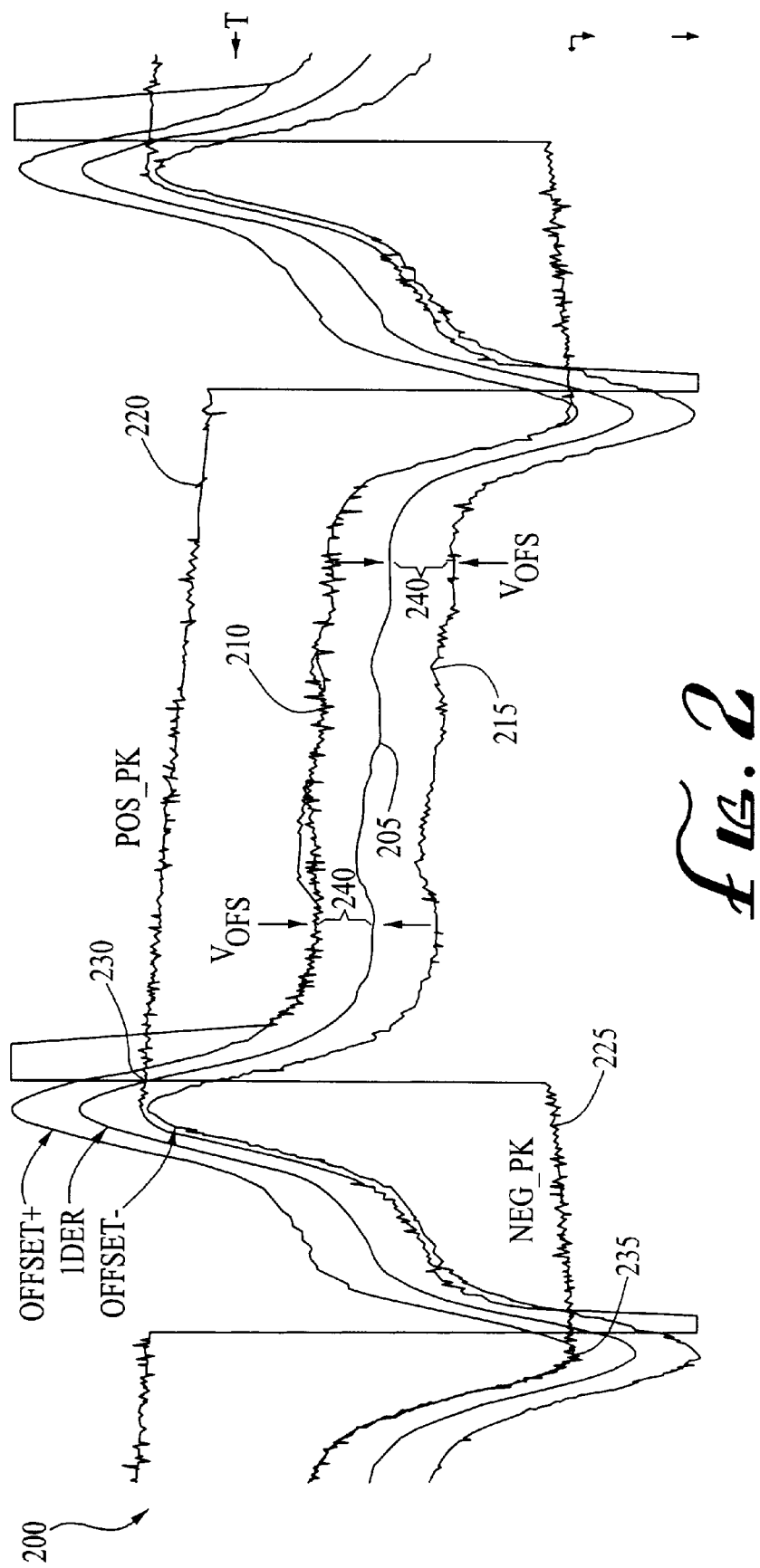

FAST EDGE DETECTION SYSTEM TOLERANT OF HIGH DEGREE OF INTERSYMBOL INTERFERENCE

RELATED APPLICATION DATA

This application is a continuing application of U.S. Provisional Application Ser. No. 60/100,268 filed Sep. 14, 1998, hereby incorporated by reference as if set forth fully herein.

FIELD OF THE INVENTION

The field of the present invention relates to data reading devices, such as scanners and barcode reading devices. In particular, barcode readers are described herein which employ methods and apparatus for improved edge detection for more accurately measuring bar and space widths under high Inter-Symbol Interference (hereafter "ISI") conditions.

BACKGROUND

A barcode label comprises a series of parallel dark bars of varying widths with intervening light spaces, also of varying widths. The information encoded in the barcode is represented by the specific sequence of bar and space widths, the precise nature of this representation depending on the particular barcode symbology in use.

Barcode reading methods typically comprise the generation of an electronic signal wherein signal voltage alternates between two preset voltage levels, one representative of the dark bars and the other representative of the light spaces. The temporal widths of these alternating pulses of high and low voltage levels correspond to the spatial widths of the bars and spaces. The temporal sequence of alternating voltage pulses of varying widths comprising the electronic signal is presented to an electronic decoding apparatus for decoding of the information encoded in the barcode.

A variety of common and well developed methods exist for generating the electronic signal by converting the spatial bar/space sequences into temporal high/low voltage sequences, i.e., barcode reading. Common types of barcode readers include spot scanners and line scanners.

Spot scanners comprise barcode reading systems wherein a source of illumination, the reading spot, is moved (i.e., scanned) across the barcode while a photodetector monitors the reflected or backscattered light. In one type of spot scanner system, typically referred to as a wand reader, the reading spot of the scanner is manually moved across the barcode. In another type of spot scanner system the reading spot of the scanner is automatically moved across the barcode in a controlled pattern. In any of the spot scanner systems, the path followed by the scanned illumination beam is typically referred to as a scan line.

The illumination source in spot scanners is typically a coherent light source (such as a laser), but may comprise a non-coherent light source (such as a light emitting diode). A laser illumination source, however, offers the advantage of high intensity illumination over a small area which may allow barcodes to be read over a large range of distances from the barcode scanner (large depth of field) and under a wide range of background illumination conditions. The photodetector associated with spot scanners may generate a high current when a large amount of light scattered from the barcode impinges on the detector, as from a light space, and likewise may produce a lower current when a small amount of light scattered from the barcode impinges on the photodetector, as from a dark bar.

In automatic spot scanning systems, a scanning mechanism, or scan engine, is utilized to automatically scan the illumination beam across the barcode. Such scanning mechanism may comprise a rotating mirror facet wheel, a dithering mirror, or other means for repetitively moving the illumination beam.

In addition to a scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror in the set, in conjunction with the scan engine, produces a scan line at a particular position and at a particular orientation.

Early prior art spot scanner systems depended upon individual scan lines extending across the entire barcode for the barcode to be successfully read. These systems presented difficulties and inefficiencies in real-time, practical applications wherein the orientation of a barcode vis-a-vis the scanner was hard to control. Accordingly, specialized piecing mechanisms, comprising software or electronics, have been developed that are capable of taking partial portions of barcodes and assembling them into a complete code, a process commonly known as stitching. Further details regarding exemplary stitching methods and systems may be found in U.S. Pat. No. 5,493,108, entitled "Method and Apparatus for Recognizing and Assembling Optical Code Labels" and issued in the name of inventors Craig D. Cherry and Donald D. Dieball, which patent is owned by the owner of the present application and is hereby incorporated by reference as if fully set forth herein.

With respect to line scanner systems, an entire barcode is focused onto a multi-element linear or areal photodetector array and the image of the barcode is detected. The photodetector array may comprise a CCD array (charge coupled device), a CMOS active or passive pixel sensor array, or other multi-element photodetector array. This type of reader may also include a light source to illuminate the barcode to provide the required signal response corresponding to the image. The imaging optics which produce an image of the barcode on the photodetector array can alternatively be thought of as projecting an image of the photodetector array (a "virtual scan line") into the scan volume in a manner completely analogous to the real scan line produced by a spot scanner. Further, scan pattern generating optics may be used to project multiple virtual scan lines into the scan volume in various directions and at varying orientations, thereby generating a virtual scan pattern, once again completely analogous to the real scan pattern produced by a spot scanner. Virtual scan pattern systems are further described in U.S. Pat. No. 5,446,271, entitled "Omnidirectional Scanning Method and Apparatus" and issued in the name of inventors Craig D. Cherry and Robert J. Actis, which patent is owned by the owner of the present application and is hereby incorporated by reference as if fully set forth herein.

Regardless of which of the barcode readers described in the preceding paragraphs is used, a raw electronic signal is generated from which the relative widths of the bars and spaces must be extracted. High-to-low or low-to-high transitions (i.e., edges) in the electronic signal voltage may be detected by any of a number of means well known in the art. A common and well known technique for edge detection is second derivative signal processing. In second derivative signal processing systems, optical edges result in peaks in the first derivative signal, and zero crossings in the second derivative signal. In such systems, zero crossings of the second derivative of the electronic signal are found during selected timing intervals as a means of detecting valid transitions. Examples of this technique are described in U.S. Pat. No. 4,000,397 entitled "Signal Processor Method and Apparatus" issued in the name of Hebert et al., and in U.S. Pat. No. 5,925,868 entitled "Method and Apparatus for Determining Transitions Between Relatively High and Low Levels in an Input Signal" issued in the name of Arends et al., and in U.S. Pat. No. 5,923,023 entitled "Method and Apparauts for Detecting Transitions in an Input Signal" also issued in the name of Arends et al. Each of the three foregoing patents are assigned to the assignee of the present application, and each is hereby incorporated by reference as if fully set forth herein. U.S. Pat. No. 4,000,397 describes the "classic" second derivative edge detector for bar code scanners, wherein zero crossings of the second derivative signal are considered valid edges if, at the moment of crossing, the absolute value of the first derivative signal exceeds a threshold. This threshold may be fixed, or it may be a function of the amplitude of neighboring first derivative peaks. In either case, though, the threshold level must be greater than the baseline level plus an allowance for noise. This is required since, in the absence of optical features, second derivative zero crossings would otherwise be considered valid.

While second derivative signal processing systems may perform satisfactorily under most conditions, the instant inventors have found that when the size of the laser spot as imaged on the target label is large compared with the smallest element (i.e., bar or space) width, then crowding, resulting in a phenomenon commonly referred to as intersymbol interference, or ISI, may occur. Such crowding occurs as the system impulse response of one edge interferes with that of neighboring edges. This effect tends to be most prevalent at the extremes of the depth-of-field (DOF) of the scanner. Accordingly, poor performance in high-ISI regions limits the scanner DOF. In the case of an edge surrounded by two adjacent edges of opposite polarity, it is possible that the first derivative peak will occur at or even below the baseline. In either of these cases, the threshold in the second derivative edge detector is not exceeded, and thus these legitimate edges may be incorrectly rejected as noise. The instant inventors have determined that, typically, when the spot size (measured as $1/e^2$ diameter) is more than about 2.5 times the size of the smallest target label feature (such ratio hereafter being referred to as the STBR, or spot-to-bar ratio), then unsatisfactory performance may result.

U.S. Pat. No. 5,210,397, to Eastman, et al., describes a dual diode edge detector for bar code scanners. In such implementation as provided in U.S. Pat. No. 5,210,397, edges are validated if the difference between the current and the previous first derivative peaks exceeds a threshold, regardless of absolute position with respect to the baseline. Thus, it is possible to detect peaks at or below the baseline and valleys at or above the baseline. Accordingly, such a detector may offer improved performance under high ISI conditions. While a dual-diode implementation may perform satisfactorily under many circumstances, the instant inventors have identified that such implementation is primarily suited to when the signal modulation depth is large compared to the forward voltage drop of the diodes. The instant inventors have further found, however, that numerous drawbacks may be inherent in such implementation under some circumstances. These drawbacks each result primarily from the fact that the threshold is effectively set by the diode forward drop. Typically, the diode forward drop is large, thus reducing the dynamic range. This is particularly apparent if the supply voltage is low. As well, the forward drop generally varies considerably over process, thus yielding inconsistent performance in production. Also, as will be further elaborated hereinbelow, the forward drop in such implementation cannot adapt to signal level. Lastly, it is necessary that the drop of the two diodes match accurately, or positive and negative going edges will not have the same relationship in time at the edge detector output as at the input.

The dynamic range of the dual diode detector is limited on the high side by the supply rails, and on the low side by the forward diode drop. This available range is typically much less than that required by the optical system in a long range scanner. While an automatic gain control can be employed to maintain the first derivative amplitude within the usable range, such controls require multiple passes for settling. As a result, response time is slowed. The instant inventors have identified a faster solution as provided herein.

SUMMARY OF THE INVENTION

The present disclosure relates to systems and methods for improving the accuracy of edge detection under high Inter-Symbol Interference, or ISI, conditions. The systems and methods detailed herein use an adaptive threshold set in real time as a function of peak amplitude. In a preferred embodiment, an amplified and filtered first derivative signal is offset by equal amounts in both directions to generate positive and negative offsets which serve as inputs to negative and positive peak detectors, respectively. In a further aspect, a preferred embodiment herein implements a fast adaptive approach wherein the first derivative signal is attenuated and AC-coupled to the positive supply to drive a peak detector with a fairly short attack time, such that its output is nearly settled on the first peak of the first derivative signal, but having a decay time long enough to keep the threshold level approximately constant across the label.

In a preferred embodiment, a peak is qualified if the original first derivative signal crosses one of the peak detector outputs. Alternatively viewed, peaks are qualified if the peak in question differs in amplitude from the previously qualified peak by the offset amount. Thus, peaks are qualified if their modulation depth exceeds a threshold, regardless of the absolute level of the peaks (such qualification strategy is hereafter referred to as "modulation depth gating").

The disclosed approach has an improved ability to render highly crowded pulses with peaks occurring through most of the range between supply rails being properly detected and with the lower limit of the dynamic range being set by the noise floor and electronic offsets, which is significantly lower than the diode forward drop limit for the dual diode detector. The disclosed approach has a relatively broad dynamic range and fast response, as well as capability to reject baseline noise similar to that of second derivative systems. In the embodiment wherein the peak detector references to the supply rail, the peak detector stage may directly drive a following voltage-to-current converter while, at the same time, maintaining the largest possible dynamic range for the first derivative and offset signals. In an alternative embodiment, a slow AGC loop circuit is wrapped around the system to assist in maintaining the first derivative signal within the dynamic range.

The preferred embodiments herein may advantageously offer more accurate rendering of relative bar and space widths under high ISI conditions, thus allowing the barcode scanner to be used under a wider range of conditions. Accordingly, the preferred embodiments herein may provide one or more of the following objects and advantages:

to provide an edge detection system which is tolerant of a high degree of inter-symbol interference;

to provide an edge detection system wherein the dynamic range is limited on the low end only by the noise in the input signal and electronic offsets;

to provide an edge detection system capable of detecting peaks through most of the dynamic range between supply rails;

to provide an edge detection system having a fast adaptive response;

to provide an edge detection system capable of rejecting baseline noise similarly to that of second derivative edge detector systems; and, to provide such a system and method which offers improved depth of field performance over that of second derivative edge detector systems.

Other objects and advantages of the present systems and methods will become apparent to those skilled in the art from a review of the detailed description in conjunction with the accompanying drawings.

BRIEF DESCRIPTION OF THE DRAWINGS

FIG. 2 is an exemplary oscillograph representation illustrating representative edge detector signals under uncrowded label conditions in accordance with a preferred embodiment herein.

DETAILED DESCRIPTION OF PREFERRED EMBODIMENTS

Figures 1, 1A:
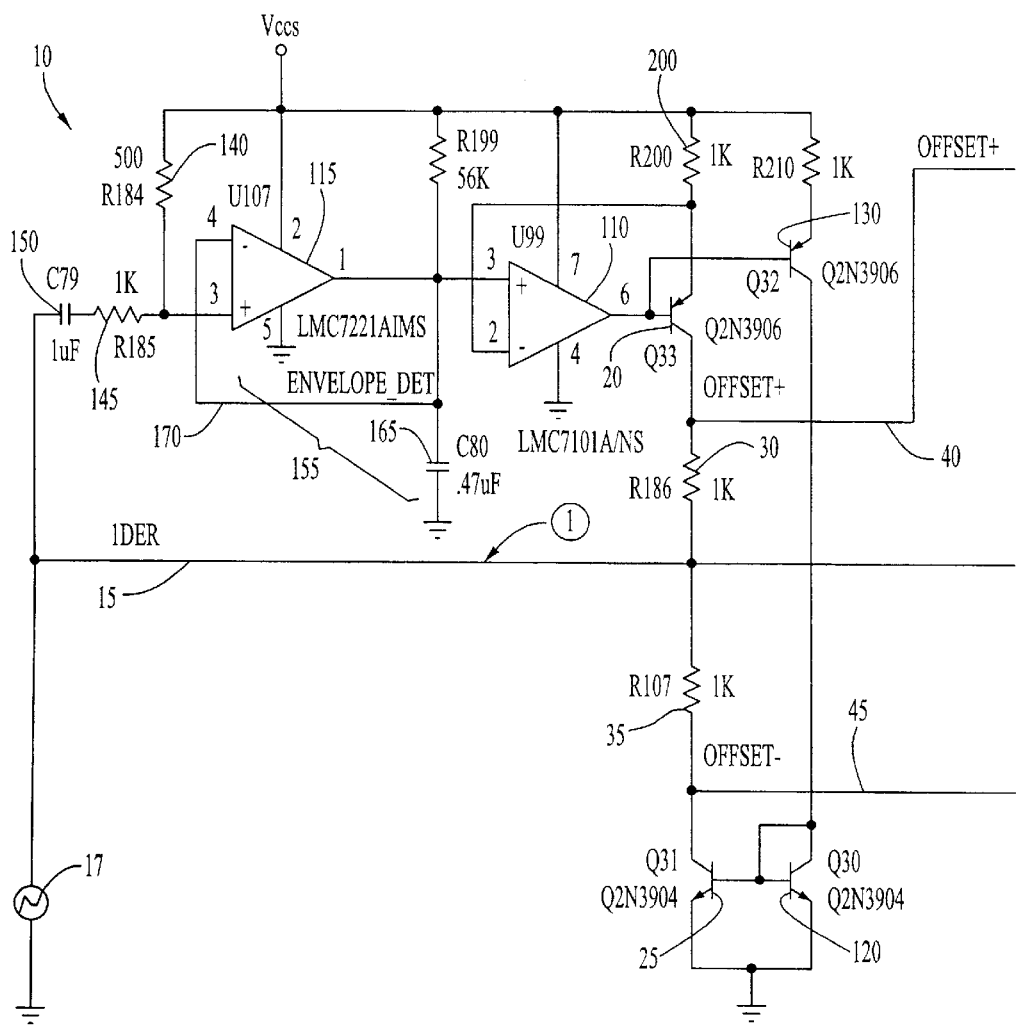
FIG. 1 is a schematic illustration of an edge detector according to a preferred embodiment herein.
Figure 1B:
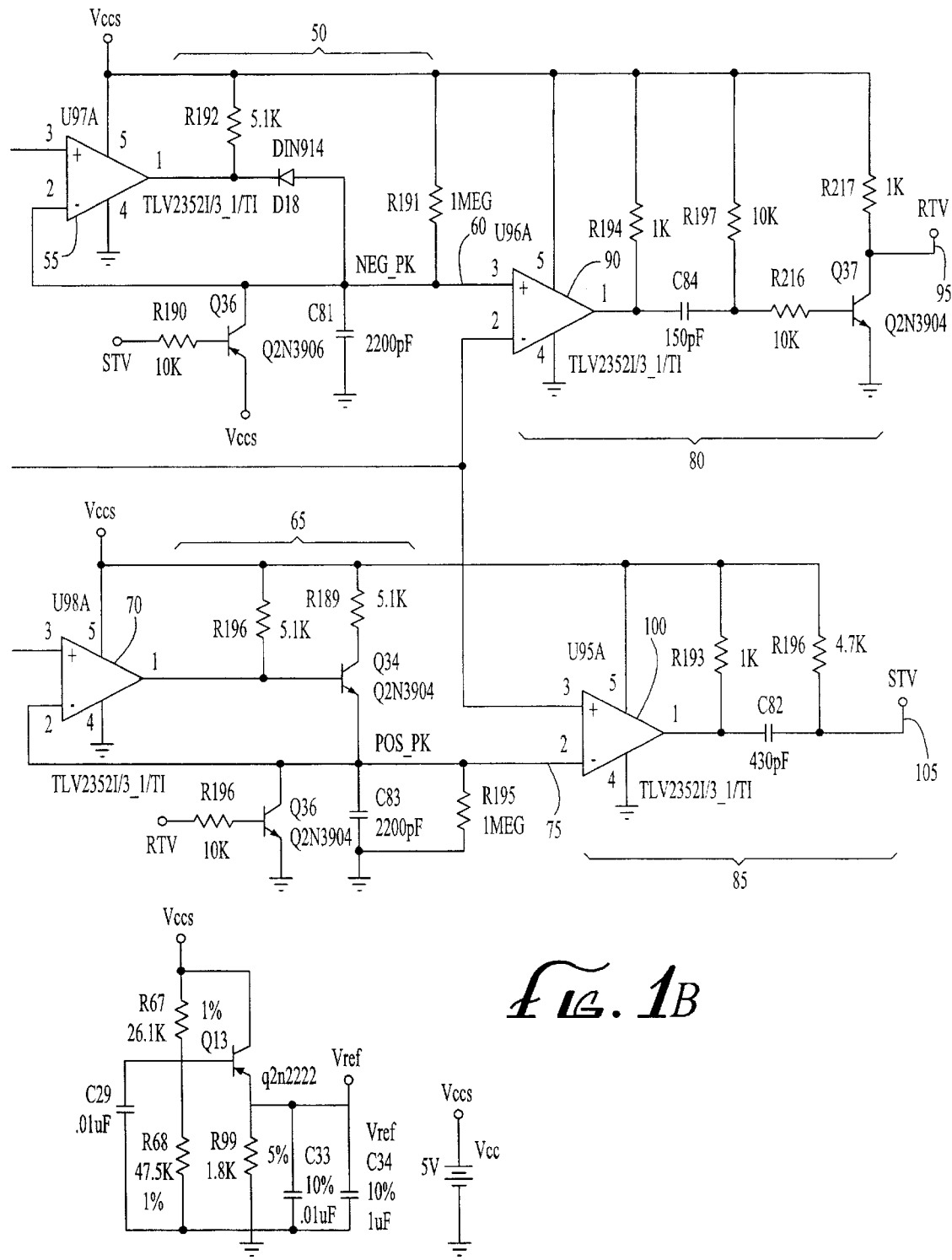
Figure 5:
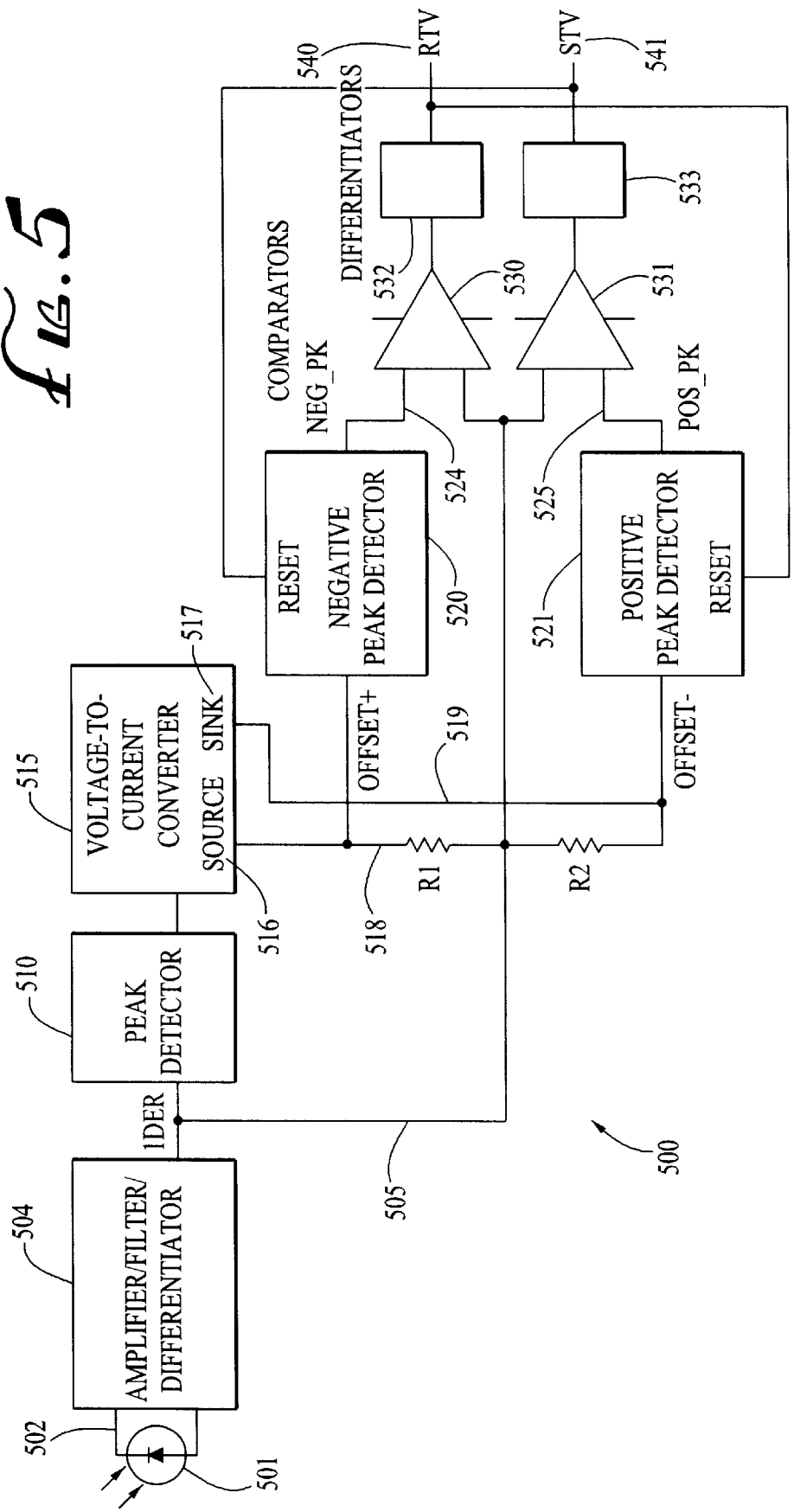
FIG. 5 is a block diagram of an edge detection system illustrating various principles in accordance with the more detailed schematic shown in FIG. 1.

FIG. 5 is a functional block diagram of an edge detection system 500 in accordance with a preferred embodiment as described herein, and FIG. 1 is a schematic diagram of an edge detector 10 utilizing principles of the embodiment depicted in FIG. 5. As shown in FIG. 5, a photodetector 501 receives light reflected from a target, such as a bar code or other symbol or target. The photodetector 501 outputs a signal 502 which generally has peaks and valleys corresponding to lighter and darker portions of the target being read. The photodetector 501 may comprise any of a variety of photosensitive elements as commonly used in the art, or their equivalent(s), including one or more photodiodes, a CCD array, a CMOS sensor array, or any other single or multi-element photodetection scheme. The precise manner of generating an input signal is not critical to the functioning of the invention as described herein. In fact, while the inventors have determined that the invention is particularly useful in addressing the phenomena of intersymbol interference in a bar code or other symbol reader wherein the input is generally a signal from a photodetector, the invention may also be useful in other applications which require precise detection of transitions between high signal levels and low signal levels in an input signal.

As further illustrated in FIG. 5, the photodetector signal 502 is connected to a signal conditioning circuit 504, which serves to amplify, filter and differentiate the photodetector signal 502. The signal conditioning circuit 504 outputs an amplified, filtered and differentiated photodetector signal 505 (hereinafter referred to as the first derivative photodetector signal). The amplification, filtering and differentiation performed by the signal conditioning circuit 504 may be accomplished in any of a variety of manners conventionally practiced and well known in the art of bar code scanning, for example.

The first derivative photodetector signal 505 is provided to circuitry for generating positive and negative offset signals. Specifically, the first derivative photodetector signal 505 is provided to a peak detector 510, which is connected to a voltage-to-current converter 515. The voltage-to-current converter 515 has a source output 516 and a sink output 517, which provide equal currents of opposite polarity, and which are connected together across two series-connected resistors R1 and R2. The first derivative photodetector signal 505 is connected to the junction of resistors R1 and R2. The peak detector 510, voltage-to-current converter 515 and resistors R1 and R2 serve to generate a positive offset signal 518 and a negative offset signal 519, in a manner described in more detail with reference to the schematic diagram depicted in FIG. 1. The amount of offset is proportional to (typically a fraction of) the peak signal amplitude detected by the peak detector 510.

The positive offset signal 518 is connected to a negative peak detector 520, and the negative offset signal 519 is connected to a positive peak detector 521. The negative peak detector 520 detects a negative peak in the positive offset signal 518, and holds the negative peak value, using it as a threshold signal 524 (denoted Neg_pk in FIG. 5). Similarly, the positive peak detector 521 detects a positive peak in the negative offset signal 519, and holds the positive peak value, using it as another threshold signal 525 (denoted Pos_pk in FIG. 5). The two threshold signals 524, 525 and the first derivative photodetector signal 505 are connected to a pair of comparators 530, 531. One comparator 530 detects a low-to-high (i.e., dark-to-light) transition in the first derivative photodetector signal 505, while the other comparator 531 detects a high-to-low (i.e., light-to-dark) transition in the first derivative photodetector signal 505. Specifically, comparator 530 changes states when the first derivative photodetector signal 505 crosses the threshold signal 524 generated by the negative-peak-detectedpositive offset signal 518, thereby indicating a low-to-high (i.e., dark-to-light) transition in the first derivative photodetector signal 505, while the other comparator 531 changes states when the first derivative photodetector signal 505 crosses the threshold signal 525 generated by the positive-peak detected negative offset signal 519, thereby indicating a high-to-low (i.e., light-to-dark) transition in the first derivative photodetector signal 505.

The outputs of the comparators 530, 531 are preferably differentiated, using differentiators 532 and 533, respectively. One differentiator 532 outputs a low-to-high (i.e., dark-to-light) transition output signal 540 (designated as "RTV" or "reset video" signal in FIG. 5). The other differentiator 533 outputs a high-to-low (i.e., light-to-dark) transition output signal 541 (designated as "STV" or "set video" signal in FIG. 5). The low-to-high (RTV) signal 540 resets the positive peak detector 521, while the high-to-low (STV) signal 541 resets the negative peak detector 520. Differentiators 532 and 533 ensure that a relatively brief reset pulse is applied to peak detectors 521 and 520, after which the RTV signal 540 and STV signal 541 are decoupled from the peak detectors 521 and 520, respectively. Differentiators 532 and 533 also allow discrimination of multiple adjacent pulses output by the RTV signal 540 or STV signal 541, should such occur.

The low-to-high (RTV) signal 540 and high-to-low (STV) signal 541 are preferably provided to a decoder (not shown) or other similar circuitry for interpreting the low-to-high and high-to-low transitions in the input signal. The decoder may, for example, measure the time between low-to-high and high-to-low transitions, using techniques well known in the art, and thereby determine the size of features (such as bars and spaces) in the target being read.

If, for some reason, two adjacent transitions (i.e., pulses) occur in the RTV signal 540 without an intervening transition in the STV signal 541, or vice versa, then the decoder or other processing circuitry can decide which of the two adjacent transitions is legitimate based, for example, on the relative amplitudes of the two consecutive pulses in the RTV signal or STV signal. Assuming that the "steeper" of the two consecutive peaks in the first derivative photodetector signal 505 is more likely to be the peak corresponding to an actual transition in the input signal, the larger of the two consecutive RTV or STV signals output by the edge detection system 500 would be deemed the valid transition. A peak detector connected to the RTV signal 540 or STV signal 541 could be used to temporarily store the peak amplitude of the first pulse in the RTV signal 540 or STV signal 541, for comparison with the amplitude of the second pulse therein should two consecutive events (i.e., pulses) in the RTV signal 540 or STV signal 541 occur. Alternatively, each RTV or STV event may be converted from an analog value to a digital value (using, e.g., an analog-to-digital (A/D) converter) for storage in a buffer, along with polarity information (i.e., RTV vs. STV) and time of occurrence of the event (or other similar feature measurement information, such as the relative time from the previous event). If multiple consecutive RTV or STV events occur, then subsequent processing circuitry may compare the digitized amplitude values for each consecutive RTV or STV event and select the event having the highest amplitude as corresponding to a valid transition, while rejecting the others.

A more detailed schematic of a particular embodiment of an edge detector 10 in accordance with principles utilized in the embodiment of FIG. 5 is depicted in FIG. 1. The input to the edge detector 10 is a first derivative photodetector signal 15 (designated as "1DER" in FIG. 1). The first derivative photodetector signal 15 is a differentiated, amplified and filtered version of the photodiode current (such as may be generated in a manner known to those skilled in the art). Transistors 20 and 25(designated as Q33 and Q31, respectively, in FIG. 1), configured as current sources, are combined with resistors 30 (R186) and 35 (R187), thereby providing a means to offset the first derivative photodetector signal 15 by equal amounts in both directions so as to generate the positive and negative offset signals 40 (designated in FIG. 1 as OFFSET+) and 45 (designated in FIG. 1 as OFFSET−). A negative peak detector 50 comprises operational amplifier 55 (U97A) and associated components. The negative peak detector 50 receives the positive offset signal 40 (OFFSET+) as its input and generates a negative peak threshold signal 60 (Neg_pk) as its output. Likewise, a positive peak detector 65 comprises operational amplifier 70 (U98A) and associated components. The positive peak detector 65 receives the negative offset signal 45 (OFFSET−) as its input and generates a positive peak threshold signal 75 (Pos_pk) as its output.

Similar to the dual diode detector operation previously described, a peak is qualified if the original first derivative photodetector signal 15 crosses either of the negative peak threshold signal 60 (Neg_pk) or the positive peak threshold signal 75 (Pos_pk). Such qualification is accomplished in the preferred embodiment shown in FIG. 1 through negative or positive peak comparison circuitry 80 or 85, respectively. Negative peak comparison circuitry 80 comprises a comparator 90 (U96A) and associated components, which collectively compare the first derivative photodetector signal 15 with the negative peak threshold signal 60 (Neg_pk) so as to generate an RTV ("reset video") signal 95 when a crossing is detected. Similarly, positive peak comparison circuitry 85 comprises a comparator 100 (U95A) and associated components, which collectively compare the first derivative photodetector signal 15 with the positive peak threshold signal 75 (Pos_pk) so as to generate the STV ("set video") signal 105 when a crossing is detected. In a manner known to those skilled in the art, the RTV signal 95 and STV signal 105 may then be utilized to provide edge information regarding the bar/space elements to the system decoder to enable decoding of the label. In particular, the RTV signal 95 and STV signal 105 may be provided to a decoder or other circuitry for measuring the time between transitions (corresponding to size of the features in the target being read) and to decode or otherwise interpret the feature measurement data.

In a further aspect of the preferred embodiment herein as shown in FIG. 1, various circuit components are utilized to implement a fast adaptive approach. Such components include operational amplifiers 110 (U99) and 115 (U107), transistors 120 (Q30), 25 (Q31), 130 (Q32), and 20 (Q33), and associated other components connected thereto. As part of the fast adaptive approach, the first derivative photodetector signal 15 is attenuated and AC-coupled to the positive power supply, using resistors 140 (R184) and 145 (R185) and capacitor 150 (C79). The resulting signal drives a negative peak detector 155, which is comprised of operational amplifier 115 (U107) and capacitor 165 (C80), such that an envelope detected signal 170 (designated $V_{ENVELOPE\_DET}$) is proportional to the peak amplitude of the first derivative photodetector signal 15, referenced to the positive power supply. The peak detector 155, as thus implemented, has a relatively short attack time, i.e., its output is nearly settled on the first peak of the first derivative photodetector signal 15, but has a decay time long enough to keep the corresponding threshold level approximately constant across the bar code label or other target being read.

By referencing to the positive supply rail, this latter stage may directly drive a following voltage-to-current converter (comprised of operational amplifier 110 (U99), transistor 20 (Q33), and resistor 80 (R200)) while maintaining the largest possible dynamic range for the first derivative photodetector signal 15, the positive offset signal 40 (OFFSET+) and the negative offset signal 45 (OFFSET−). The collector current of transistor 20 (Q33) is then proportional to the peak amplitude of the first derivative photodetector signal 15 as well. When impressed across resistor 30 (R186), the collector current of transistor 20 (Q33) sets the offset between the first derivative photodetector signal 15 and the positive offset signal 40 (OFFSET+). This current source is mirrored by transistor 130 (Q32), and again by the combination of transistors 120 (Q30) and 25 (Q31), such that the negative offset signal 45 (OFFSET−) is offset by the same amount as the positive offset signal 40 (OFFSET+), but in a negative direction. Accordingly, the offset, and, thus, the effective modulation depth threshold, is adapted in real time to the amplitudes of peaks in the first derivative photodetector signal 15.

With reference to FIG. 2, an exemplary oscillograph representation 200 is provided to illustrate the operation of the preferred embodiment in FIG. 1 in relation to a sample first derivative photodetector signal 205 (designated "1DER", as in FIG. 1) and associated OFFSET+210 and OFFSET−215 signals derived as detailed above, as well as sample POS_PK and NEG_PK signals 220 and 225, respectively. The representation 200 of FIG. 2 is illustrative of sample signals under uncrowded label conditions. In operation, when a positive peak 230 of the first derivative photodetector signal 205 crosses the POS_PK signal 220, then the output of comparator U95A 100 (of FIG. 1) goes high (not shown) indicating that a dark region has been entered. It also causes the negative peak detector 50 (of FIG. 1) to be reset to the positive supply so that it is able to detect negative peaks of the first derivative photodetector signal 15 (or 205) with amplitudes much higher than the previous negative peak. Corresponding operation with respect to the crossing of the NEG_PK signal 225 by a negative peak 235 of the first derivative photodetector signal 205 is illustrated in FIGS. 1 and 2 with respect to the detection of negative peaks.

In accordance with the above system and methods, peaks occurring through most of the range between supply rails may be properly detected. Peaks are qualified in the preferred embodiment herein only if the peak in question differs in amplitude from the previously qualified peak by the offset amount $V_{OFS}$ 240 (in FIG. 2), thus providing a threshold which is irrespective of the absolute level of the peaks. Accordingly, since peaks are qualified if their modulation depth exceeds such threshold, this qualification strategy is referred to as modulation depth gating. Modulation depth gating provides improved ability to render crowded edges, e.g., as compared to a second derivative and other approaches, yet has similar capability to reject baseline noise, e.g., as in second derivative approaches.

It should be noted that the actual location of transitions in the photodetector input signal is preferably defined as the points at which the first derivative photodetector signal crosses the threshold used for modulation depth gating, as opposed to the actual topmost point (i.e., crest) of a peak. The effect is to shift the apparent position of each transition to the right by a small amount (i.e., transitions in the RTV or STV signals lag the actual crest of the positive or negative peaks by a small amount). It is possible that variation in the steepness of the peaks could cause some distortion in the observed transition points, since steeper peaks will cause the threshold for modulation depth gating to be crossed sooner, while more shallow peaks will cause the threshold to be crossed later. However, the amount of distortion is not viewed as significant. In conditions where feature edges (and thus the signal peaks) are not crowded, the peaks in the photodetector signal will generally be wide and the amount of distortion will be so small as to be insignificant. On the other hand, in conditions where the feature edges are crowded, intersymbol interference will generally cause the apparent peak location to shift to the left or right. Based on empirical studies by the inventors, the distortion caused by the effect of intersymbol interference is estimated to be on the order of ten times greater than any distortion that might be caused by modulation depth gating. Thus, in crowded edge conditions, any distortion arising from modulation depth gating is relatively insignificant compared to other sources of distortion in such conditions.

Figure 3:
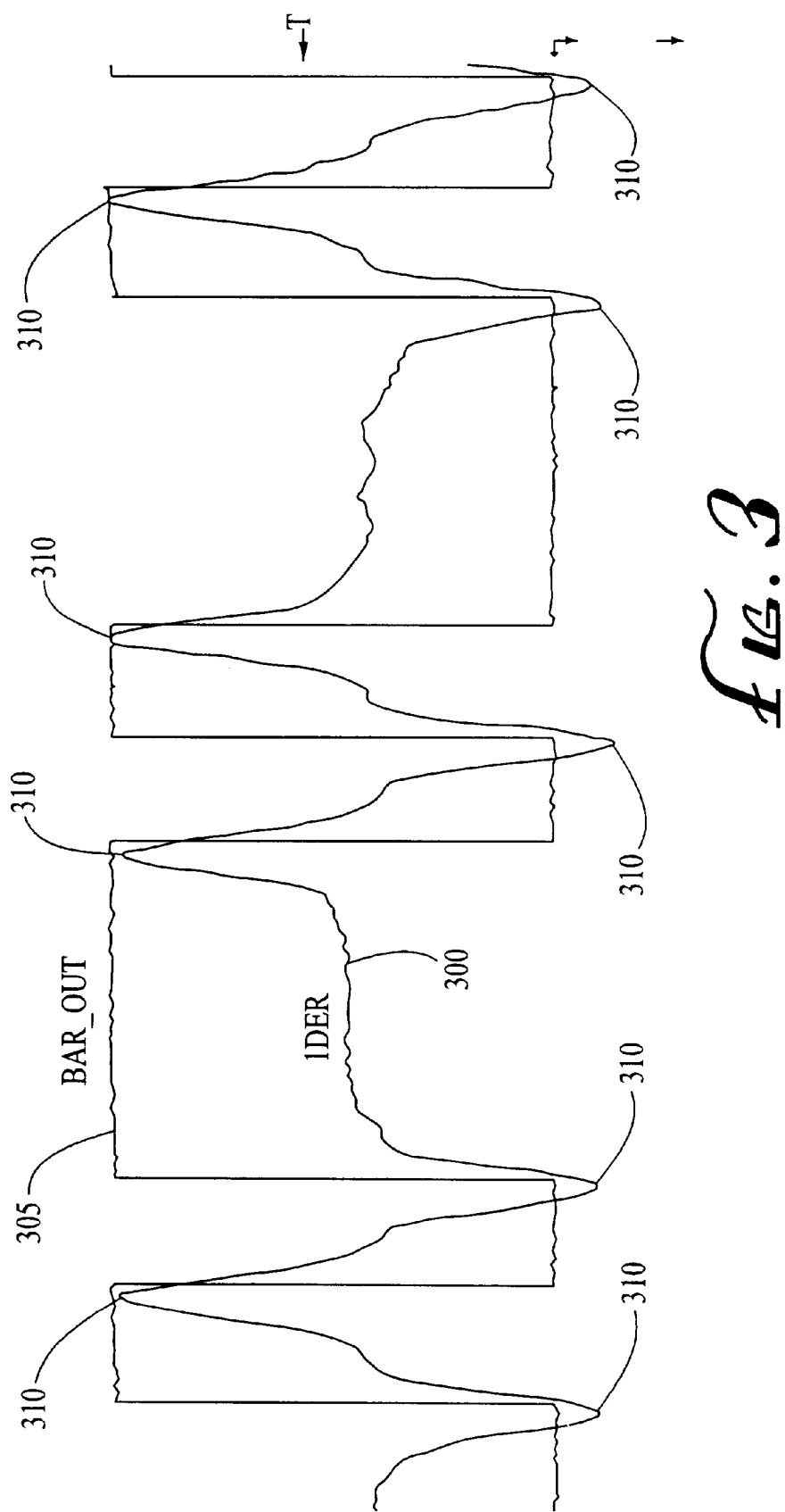
FIG. 3 is an exemplary oscillograph representation comparatively illustrating a 1DER signal in relation to associated bar/space elements under uncrowded label conditions in accordance with a preferred embodiment herein.
Figure 4:
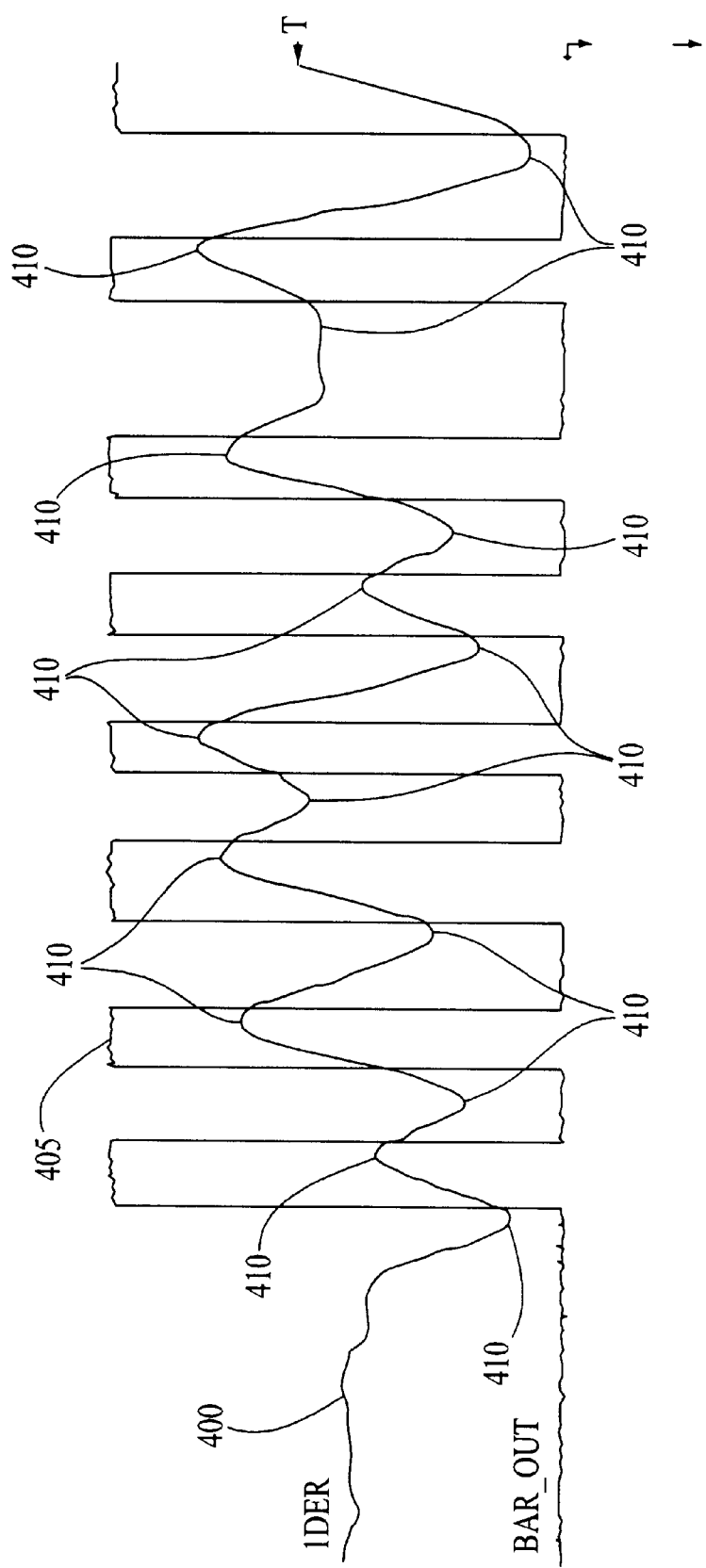
FIG. 4 is an exemplary oscillograph representation comparatively illustrating a 1DER signal in relation to associated bar/space elements under crowded (e.g., high-ISI) conditions in accordance with a preferred embodiment herein.

With further reference to FIGS. 3 and 4, there is shown oscillograph representations comparing exemplary first derivative photodetector signals 300 and 400 (in each case designated as "1DER", as in FIGS. 1 and 2), respectively, to the corresponding BAR-OUT signals 305 and 405, respectively, which may realized in accordance with the preferred system and methods herein. FIG. 3 provides such comparison in the case of a label portion which exhibits uncrowded conditions and, thus, the signal peaks 310 in the first derivative photodetector signal 300 are relatively uniform across the label portion. FIG. 4 provides a similar comparison in the case of a label portion which exhibits crowded label conditions indicative of a high degree of Inter-Symbol Interference. As may be seen in FIG. 4, the signal peaks 410 in the first derivative photodetector signal 400 are not uniform across the label portion but, in fact, vary considerably. While a system utilizing an existing threshold approach (e.g., a second derivative approach) may be capable of adequately detecting the signal peaks 310 in the first derivative photodetector signal 300 as exhibited in FIG. 3, such systems would reject as noise many of the signal peaks 410 in the first derivative photodetector signal 400 illustrated in FIG. 4. The fast adaptive, modulation depth gating approach of the instant system and methods, however, allow the signal peaks 310 and 410 under either of the conditions shown in FIG. 3 or 4 to be properly detected. Thus, crowded labels exhibiting high degrees of Inter-Symbol Interference may be decoded without sacrificing an ability to properly render uncrowded labels as provided in existing systems.

In accordance with the fast adaptive approach of the preferred embodiment as described hereinabove, an adaptive threshold can be initialized on the first peak of the target bar code; thus, enabling successful rendering of the code on the first pass. In contrast, if Automatic Gain Control (AGC) circuitry were to be implemented and configured to respond that quickly, the signal distortion of the first derivative photodetector signal 15 during the settling interval would be much too high. Further advantageously, the approach of the preferred embodiment herein provides a dynamic range in which the lower limit is set by the noise floor and electronic offsets, which is significantly lower than the diode forward drop limit for the dual diode detector as previously discussed. For example, with the supply voltage, i.e., $V_{CC}$, equal to five volts, a dual diode detector implementation would exhibit a dynamic range of about 15:1 (24 dB); by contrast, a detector in accordance with the disclosure herein would exhibit a range greater than 30:1. Provided that the first derivative photodetector signal 15 is within this larger dynamic range, the label should be properly rendered on the first pass providing the fastest response for the user.

In a further aspect of the system and methods herein, it is envisioned that if the increased dynamic range provided as detailed above is still insufficient to maintain the first derivative photodetector signal 15 within its limits, then a slower AGC loop circuit could be wrapped around the system described here. The system would respond very quickly if the AGC initial conditions caused the first derivative photodetector signal 15 to fall within the 30:1 range, otherwise the AGC would bring the level of the first derivative photodetector signal 15 within the dynamic range within a few frames. It is further envisioned that such AGC could have a very "coarse" adjustment, because of the larger detector dynamic range exhibited in the first place.

The systems and methods herein may offer further improved performance in relation to scanner depth of field. Exemplary of such improved depth of field performance are results of certain comparative tests by the instant inventors between an existing second derivative edge detector system and a system implementing the methods herein. In this regard, the disclosed system and methods herein yielded a far depth of field of 11.5" in relation to element width of 7.5 mi, 18" in relation to element width of 13 mil (Code 39 label), 28" in relation to element width of 20 mil, when applied in a miniature bar code scanning module. By contrast, the conventional second derivative edge detector system utilized in these comparative tests yielded corresponding depth of field results of 10", 16" and 23", respectively. Such results were obtained in relation to a disclosed system without an AGC loop circuit as provided herein. In regards to a system with an AGC loop circuit (at +5X Gain), the disclosed system and methods yielded a depth of field of 45" in relation to element width of 55 Mil, while the second derivative edge detector system yielded a corresponding depth of field of 40".

Figure 6:
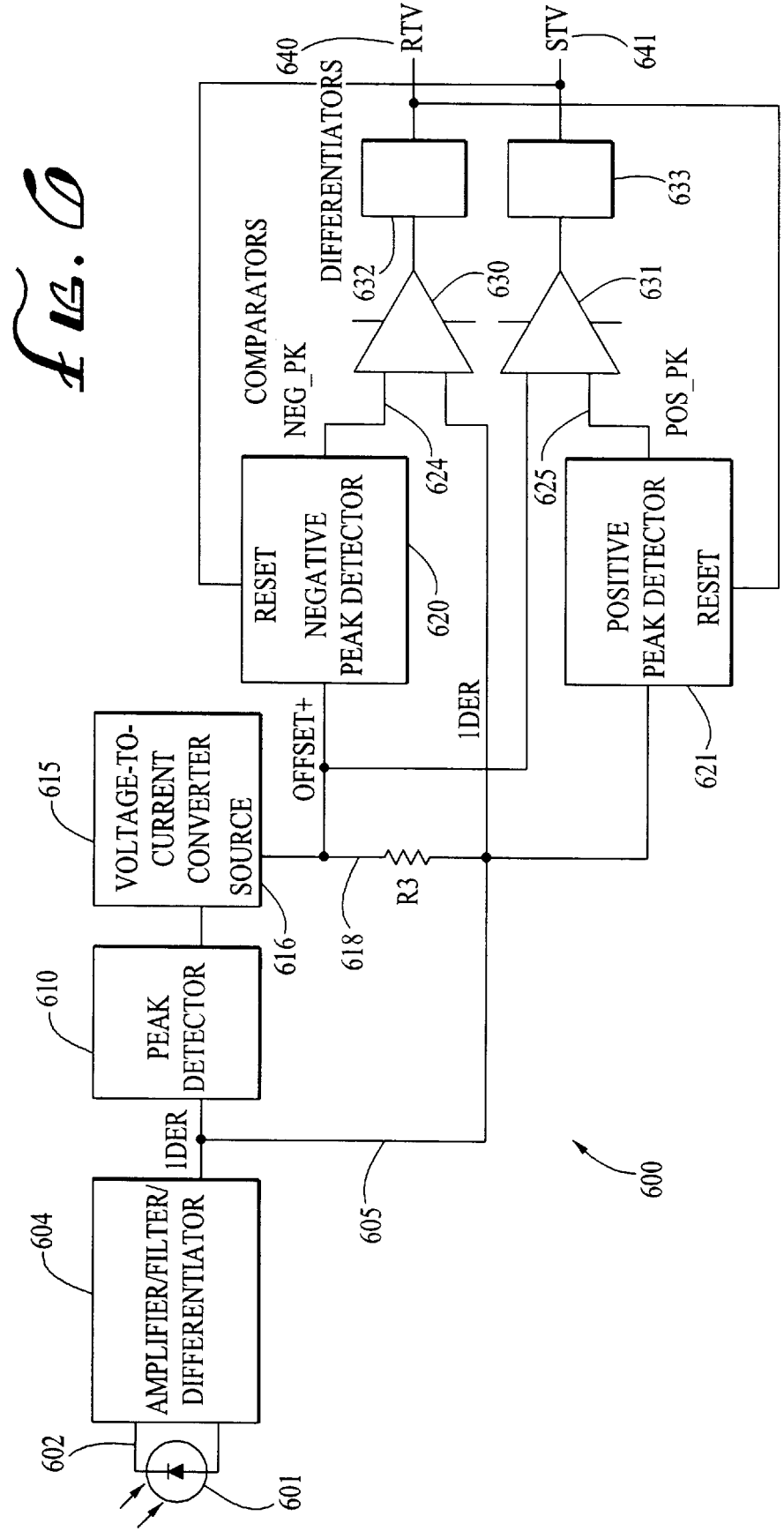
FIG. 6 is a block diagram of an alternative embodiment of an edge detection system.

An alternative embodiment in accordance with various inventive principles as disclosed herein is depicted in a block form in FIG. 6. Components in FIG. 6 having a similar function to components depicted in FIG. 5 are identified by similar last two digits in the respective reference numerals, except that the components in FIG. 6 are referenced with a series "6xx" whereas in FIG. 5 they are referenced with a series "5xx". Thus, for example, the edge detection system 600 depicted in FIG. 6 has a photodetector 601 similar to photodetector 501 in FIG. 5, and has a signal conditioning block 604 similar to signal conditioning block 504 shown in FIG. 5, and so on.

The embodiment shown in FIG. 6 differs from that shown in FIG. 5 in that only a single offset signal 618 is generated, as opposed to positive and negative offset signals 518 and 519 in FIG. 5. The FIG. 6 embodiment eliminates the current mirrors Q30–Q32 and R107 in FIG. 5, and therefore may be viewed as more hardware efficient. In the edge detection system 600 shown in FIG. 6, the (positive) offset signal 618 is provided to negative peak detector 620, but the first derivative photodetector signal 605 (as opposed to a negative offset signal) is provided to positive peak detector 621. Comparator 630 uses the negative peak value of the positive offset signal 618 as a threshold signal 624, and changes states when the first derivative photodetector signal 605 crosses the threshold signal 624, thereby indicating a dark-to-light transition. Conversely, comparator 631 uses the positive peak value of the first derivative photodetector signal 605 as a threshold signal 625, and changes states when the positive offset signal 618 crosses the threshold signal 625, thereby indicating a light-to-dark transition. As with the edge detection system 500 shown in FIG. 5, the outputs of comparators 630, 631 may be differentiated using differentiators 632 and 633, respectively, and the resulting RTV signal 640 and STV signal 641 may be used to reset positive and negative peak detectors 620 and 621, respectively, as well as provided to a decoder or other circuitry for further processing.

The disclosed approach (preferred embodiments of which are shown in block format in FIGS. 5 or 6, or schematically in FIG. 1) each have the ability to render highly crowded pulses, has good dynamic range and fast response. While the above-identified components are used in conjunction with such preferred embodiment, it is noted that the various aspects of the present edge detector system are readily reconfigurable to accommodate differing components and/or circuit design while still remaining within the scope and spirit of the present disclosure and any appended claims. In addition, the present edge detection systems and methods have been set forth in the form of preferred embodiments. Modifications to the disclosed edge detection system, as well as other alternative embodiments may be devised, however, without departing from the scope and spirit of the inventive concepts set forth herein and defined in any appended claims; such modifications and alternate embodiments are also intended to be within the scope of this application.

What is claimed is:

1. A symbol reader, comprising:
   means for reading a symbol and generating an input signal thereby, said symbol having light and dark features, said input signal having an amplitude corresponding to the intensity of reflected light received from said symbol;
   means for conditioning said input signal, and generating a conditioned input signal thereby;
   means for generating a replica signal of said conditioned input signal offset from said conditioned input signal by an offset value; and
   means for qualifying a peak in said conditioned input signal as indicative of a transition between a light feature and dark feature in said symbol based upon a modulation depth between the peak and an adjacent peak of opposite polarity, wherein the modulation depth for qualifying said peak is based upon said offset value.

2. The symbol reader of claim 1, wherein said means for conditioning said input signal comprises a differentiator.

3. The symbol reader of claim 2, wherein said means for generating a replica signal comprises generating a positive offset replica signal and a negative offset replica signal; and
   wherein said means for qualifying a peak in said conditioned input signal comprises:
   a threshold setting circuit for setting a threshold signal level, said threshold signal level comprising (i) for each negative peak in said conditioned input signal, a first level corresponding to a negative peak amplitude of said positive offset replica signal, and (ii) for each positive peak in said conditioned input signal, a second level corresponding to a positive peak amplitude of said negative offset replica signal; and
   a comparison circuit connected to said threshold setting circuit and t o said conditioned input signal.

4. The symbol reader of claim 3, wherein said comparison circuit outputs a high-to-low transition signal or a low-to-high transition signal when said conditioned input signal traverses said threshold signal level.

5. The symbol reader of claim 4, wherein said first offset value and said second offset value are equal.

6. The symbol reader of claim 1, wherein said means for generating a replica signal comprises:
   a positive offset signal generator connected to said conditioned input signal, said positive offset signal generator outputting a positive replica of said conditioned input signal positively offset from said conditioned input signal; and
   a negative offset signal generator connected to said conditioned input signal, said negative offset signal generator outputting a negative replica of said conditioned input signal negatively offset from said conditioned input signal.

7. The symbol reader of claim 6, wherein said means for qualifying a peak in said conditioned input signal comprises:
- a negative peak detector connected to said positive offset signal generator, said negative peak detector outputting a first threshold signal;
- a positive peak detector connected to said negative offset signal generator, said positive peak detector outputting a second threshold signal;
- a first comparator having inputs connected to said conditioned input signal and to an output of said negative peak detector; and
- a second comparator having inputs connected to said conditioned input signal and to an output of said positive peak detector.

8. An edge detection system for detecting and qualifying transitions in a photodetector input signal, comprising:
- a differentiator connected to said photodetector input signal, said differentiator outputting a first derivative photodetector signal; and
- a modulation depth gating circuit, said modulation depth gating circuit detecting a transition in said photodetector input signal by comparing said first derivative photodetector signal to a modulation depth threshold signal adapted to an amplitude of a first peak in said first derivative photodetector signal.

9. The edge detection system of claim 8, wherein said modulation depth gating circuit comprises
- an adaptive threshold setting circuit and a comparison circuit, said adaptive threshold setting circuit comprising a dynamic tracking circuit connected to said first derivative photodetector signal,
- an offset signal generator connected to said dynamic tracking circuit, and
- a peak detector connected to said offset signal generator, wherein said offset signal generator outputting a replica of said first derivative photodetector signal offset from said first derivative photodetector signal by a value determined by said dynamic tracking circuit, said peak detector outputting said modulation depth threshold signal, and said comparison circuit outputting a transition signal when said first derivative photodetector signal crosses said modulation depth threshold signal.

10. The edge detection system of claim 8, wherein said first derivative photodetector signal has varying amplitudes of peaks corresponding to edges to be detected.

11. The edge detection system of claim 8, wherein said modulation depth threshold signal implements a threshold value, said threshold value being proportional to a peak amplitude of said first derivative photodetector signal.

12. An apparatus, comprising:
- a photodetector;
- a signal conditioner connected to said photodetector, said signal conditioner comprising a differentiator and outputting a first derivative photodetector signal, said first derivative photodetector signal having varying amplitudes of peaks corresponding to edges to be detected;
- a modulation depth threshold setting circuit, said modulation depth threshold setting circuit comprising an envelope detector connected to said first derivative photodetector signal, said envelope detector outputting an envelope signal adapted to said first derivative photodetector signal, said modulation depth threshold setting circuit outputting a threshold setting signal based on said envelope signal;
- a peak detector connected to said threshold setting signal, said peak detector outputting a threshold signal adapted to said first derivative photodetector signal and detecting a peak amplitude of said threshold setting signal; and
- a comparator having inputs connected to said threshold signal and to said first derivative photodetector signal, said comparator outputting a peak qualifying signal when said first derivative photodetector signal crosses said threshold signal.

13. The apparatus of claim 12, wherein said signal conditioner further comprises an amplifier and a filter.

14. The apparatus of claim 12, wherein said envelope detector comprises a negative peak detector.

15. The apparatus of claim 12, wherein said modulation depth threshold setting circuit further comprises an offset signal generator connected to said envelope detector, said offset signal generator outputting a replica signal of said first derivative photodetector signal offset from said first derivative photodetector signal by an offset value.

16. A method for detecting and qualifying transitions in a photodetector input signal, comprising the steps of:
- receiving a photodetector signal;
- differentiating said photodetector signal, and generating a first derivative photodetector signal thereby;
- setting a threshold level adapted to an amplitude of a first peak in said first derivative photodetector signal, said threshold level differing from said amplitude of said first peak by an offset value; and
- qualifying said first peak as a valid transition in said photodetector signal when said first derivative photodetector signal crosses said threshold level.

17. The method of claim 10, wherein said step of setting said threshold level comprises the steps of:
- dynamically tracking an amplitude of said first derivative photodetector signal;
- detecting a positive or negative peak in said first derivative photodetector signal;
- for a positive peak, setting said threshold level below said positive peak by said offset value; and
- for a negative peak, setting said threshold level above said negative peak by said offset value.

18. The method of claim 16, wherein said first derivative photodetector signal has varying amplitudes of peaks corresponding to transitions in said photodetector signal.

19. The method of claim 16, wherein the step of setting a threshold level includes the step of generating a peak amplitude signal of said first derivative photodetector signal, wherein said offset value is proportional to said peak amplitude signal.

20. A method for detecting and qualifying transitions in a photodetector input signal, comprising the steps of:
- receiving a photodetector signal;
- differentiating said photodetector signal, and generating a first derivative photodetector signal thereby, said first derivative photodetector signal having varying amplitudes of positive peaks corresponding to low-to-high transitions in said photodetector signal and varying amplitudes of negative peaks corresponding to high-to-low transitions in said photodetector signal;
- for each negative peak in said first derivative photodetector signal, setting a negative peak threshold level adapted to said first derivative photodetector signal and above a peak amplitude of said negative peak by an offset value; and
- qualifying a negative peak as a valid transition in said photodetector signal when said first derivative photodetector signal crosses said negative peak threshold level.

21. The method of claim 20, further comprising the steps of
   tracking an envelope of said first derivative photodetector signal; and
   generating a positive offset replica signal of said first derivative photodetector signal by adding said offset value to said first derivative photodetector signal, said offset value determined from said envelope;
   wherein said step of setting said negative peak threshold level comprises the step of detecting a negative peak in said positive offset replica signal.

22. The method of claim 20, further comprising the step of measuring a distance between each qualified positive peak and each qualified negative peak, and generating a set of feature measurement data thereby.

23. The method of claim 22, further comprising the step of decoding said set of feature measurement data to determine the contents of a symbol being read by said photodetector.

24. The method of claim 20, wherein said positive peak is qualified as a valid low-to-high transition in said photodetector signal when said first derivative photodetector signal crosses said positive peak threshold level, and wherein said negative peak is qualified as a valid high-to-low transition in said photodetector signal when said first derivative photodetector signal crosses said negative peak threshold level.

25. The method of claim 20 further comprising the step of detecting a peak amplitude of said first derivative photodetector signal, wherein said offset value is proportional to said peak amplitude detected from said first derivative photodetector signal.

26. The method of claim 20 further comprising the steps of:
   generating a positive replica signal of said first derivative photodetector signal exceeding said first derivative photodetector signal by said offset value;
   detecting a peak amplitude of a positive peak of said first derivative photodetector signal;
   qualifying a positive peak as a valid transition in said photodetector signal when said peak amplitude of a positive peak detected crosses said positive replica signal of said first derivative photodetector signal generated.

27. An optical symbol reader, comprising:
   a photodetector;
   a signal conditioner connected to said photodetector, said signal conditioner comprising a differentiator and outputting a first derivative photodetector signal;
   an envelope detector connected to said first derivative photodetector signal;
   a positive offset signal generator connected to said envelope detector, said positive offset signal generator outputting a positive replica of said first derivative photodetector signal exceeding said first derivative photodetector signal by a first predetermined minimum modulation depth;
   a negative offset signal generator connected to said envelope detector, said negative offset signal generator outputting a negative replica of said first derivative photodetector signal negatively offset from said first derivative photodetector signal by a second predetermined minimum modulation depth;
   a negative peak detector connected to said positive replica of said first derivative photodetector signal, said negative peak detector outputting a first threshold signal;
   a positive peak detector connected to said negative replica of said first derivative photodetector signal, said positive peak detector outputting a second threshold signal;
   a first comparator having inputs connected to said first threshold signal and said first derivative photodetector signal, said first comparator changing states and thereby indicating a valid transition in said photodetector signal when said first derivative photodetector signal crosses said first threshold signal; and
   a second comparator having inputs connected to said second threshold signal and said first derivative photodetector signal, said second comparator changing states and thereby indicating a valid transition in said photodetector signal when said first derivative photodetector signal crosses said second threshold signal.

28. The optical symbol reader of claim 27, further comprising a decoder connected to outputs from said first comparator and said second comparator.

29. The optical symbol reader of claim 27, wherein an output of said first comparator is connected to said negative peak detector as a reset signal, and wherein an output of said second comparator is connected to said positive peak detector as a reset signal.

30. The optical symbol reader of claim 27, wherein said first predetermined minimum modulation depth and said second predetermined minimum modulation depth are the same.

31. The optical symbol reader of claim 27, wherein said first comparator changing states indicates a valid low-to-high transition in said photodetector signal when said first derivative photodetector signal crosses said first threshold signal, and wherein said second comparator changing states indicates a valid high-to-low transition in said photodetector signal when said first derivative photodetector signal crosses said second threshold signal.

* * * * *